United States Patent
Kato

(10) Patent No.: US 12,500,256 B2
(45) Date of Patent: Dec. 16, 2025

(54) FUEL CELL SYSTEM

(71) Applicant: HONDA MOTOR CO., LTD., Tokyo (JP)

(72) Inventor: Koichi Kato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 483 days.

(21) Appl. No.: 18/113,304

(22) Filed: Feb. 23, 2023

(65) Prior Publication Data

US 2023/0290981 A1 Sep. 14, 2023

(30) Foreign Application Priority Data

Mar. 10, 2022 (JP) .................... 2022-037132

(51) Int. Cl.
  *H01M 8/04992* (2016.01)
  *H01M 8/0432* (2016.01)
  (Continued)

(52) U.S. Cl.
  CPC ... *H01M 8/04992* (2013.01); *H01M 8/04358* (2013.01); *H01M 8/04574* (2013.01); *H01M 8/04604* (2013.01); *H01M 8/04701* (2013.01); *H01M 8/04753* (2013.01); *H01M 2008/1095* (2013.01)

(58) Field of Classification Search
  CPC ......... H01M 8/04992; H01M 8/04925; H01M 8/0494; H01M 8/04358; H01M 8/04574; H01M 8/04604; H01M 8/04701; H01M 8/04753; H01M 2008/1095
  See application file for complete search history.

(56) References Cited

U.S. PATENT DOCUMENTS

2009/0110987 A1 4/2009 Kagami
2010/0221630 A1* 9/2010 Kajiwara .......... H01M 8/04753
                                                         429/513

(Continued)

FOREIGN PATENT DOCUMENTS

JP  2005-302571 A  10/2005
JP  2009-099294 A   5/2009

(Continued)

OTHER PUBLICATIONS

Office Action dated Apr. 2, 2024 issued in the corresponding Japanese Patent Application No. 2022-037132 with the English machine translation thereof.

(Continued)

*Primary Examiner* — Raymond Alejandro
(74) *Attorney, Agent, or Firm* — Carrier, Shende & Associates P.C.; Joseph P. Carrier; Fulchand P. Shende

(57) ABSTRACT

A control device switches between a first injection control of injecting the fuel gas by sequentially providing periods during which at least one of the plurality of injectors injects the fuel gas if it is determined that the power generation state of the fuel cell stack is stable based on a detected power generation state, and a second injection control of injecting the fuel gas by intermittently providing periods during which the plurality of injectors simultaneously inject the fuel gas if it is determined that the power generation state of the fuel cell stack is not stable based on the detected power generation state.

6 Claims, 7 Drawing Sheets

(51) Int. Cl.
  *H01M 8/04537*  (2016.01)
  *H01M 8/04701*  (2016.01)
  *H01M 8/04746*  (2016.01)
  *H01M 8/10*     (2016.01)

(56) References Cited

U.S. PATENT DOCUMENTS

| | | | |
|---|---|---|---|
| 2017/0250416 A1 | 8/2017 | Watanabe et al. | |
| 2018/0331375 A1* | 11/2018 | Egawa | H01M 8/04104 |
| 2019/0296376 A1 | 9/2019 | Mizumoto et al. | |
| 2022/0109169 A1* | 4/2022 | Suganuma | H01M 8/04119 |

FOREIGN PATENT DOCUMENTS

| | | |
|---|---|---|
| JP | 2015-201408 A | 11/2015 |
| JP | 2017-157316 A | 9/2017 |
| JP | 2019-169264 A | 10/2019 |

OTHER PUBLICATIONS

Office Action dated Nov. 21, 2023 issued in the corresponding Japanese Patent Application No. 2022-037132 with the English machine translation thereof.

* cited by examiner

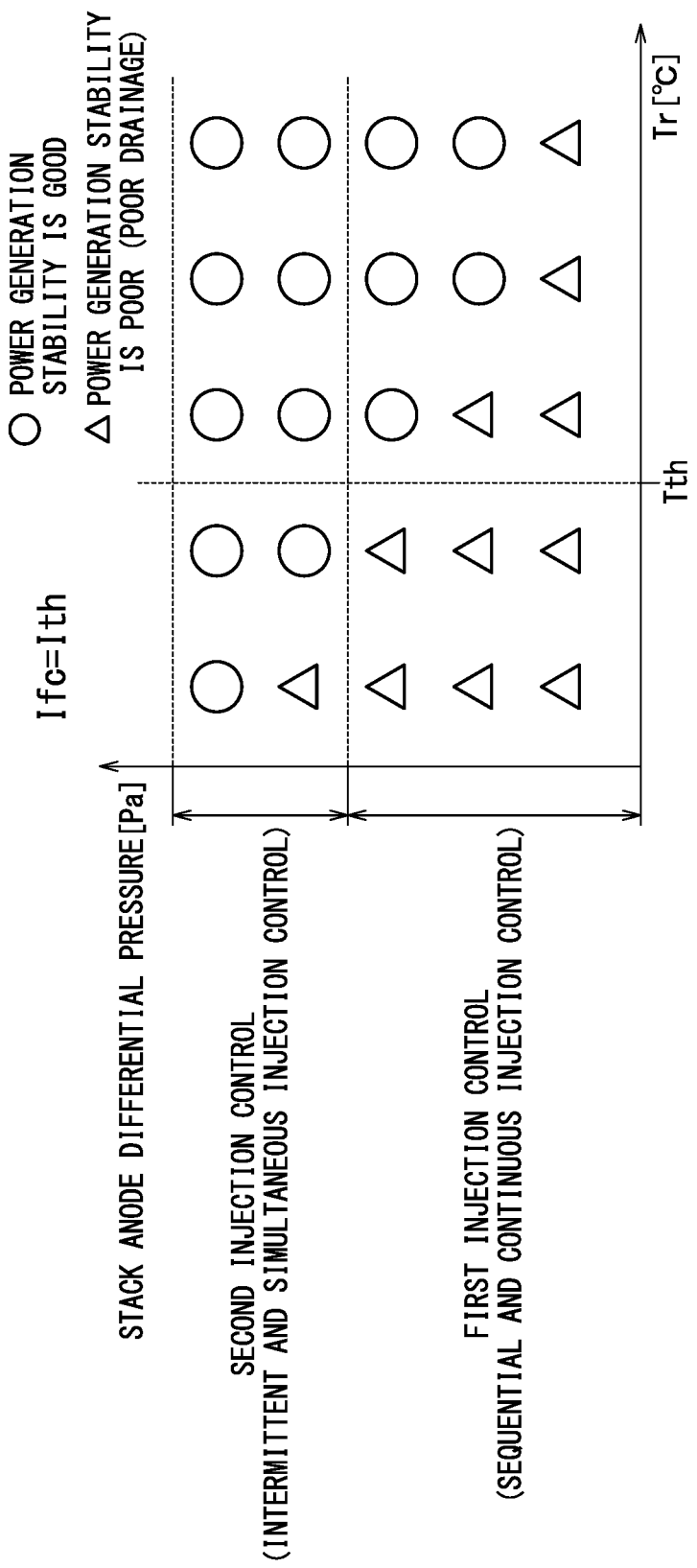

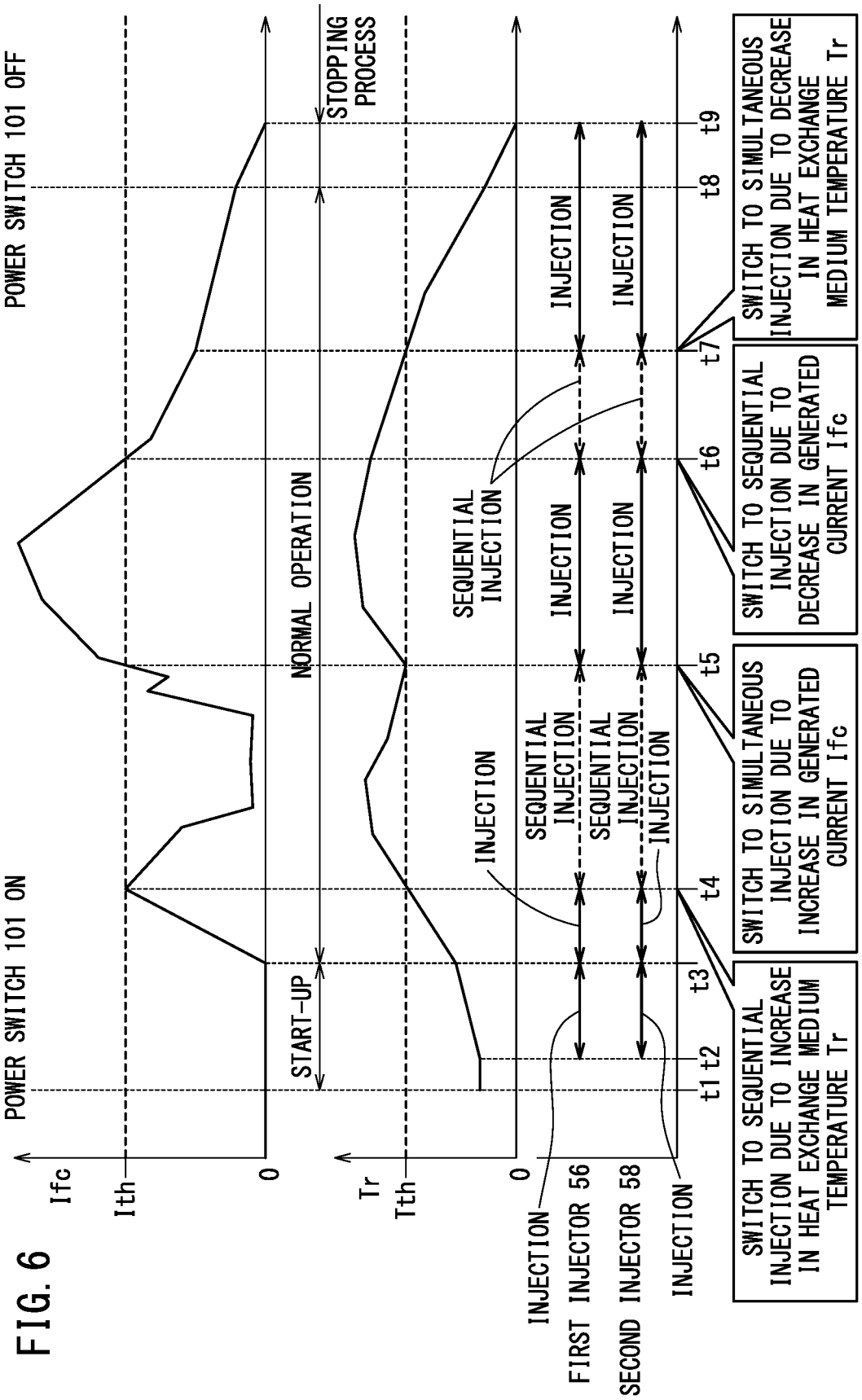

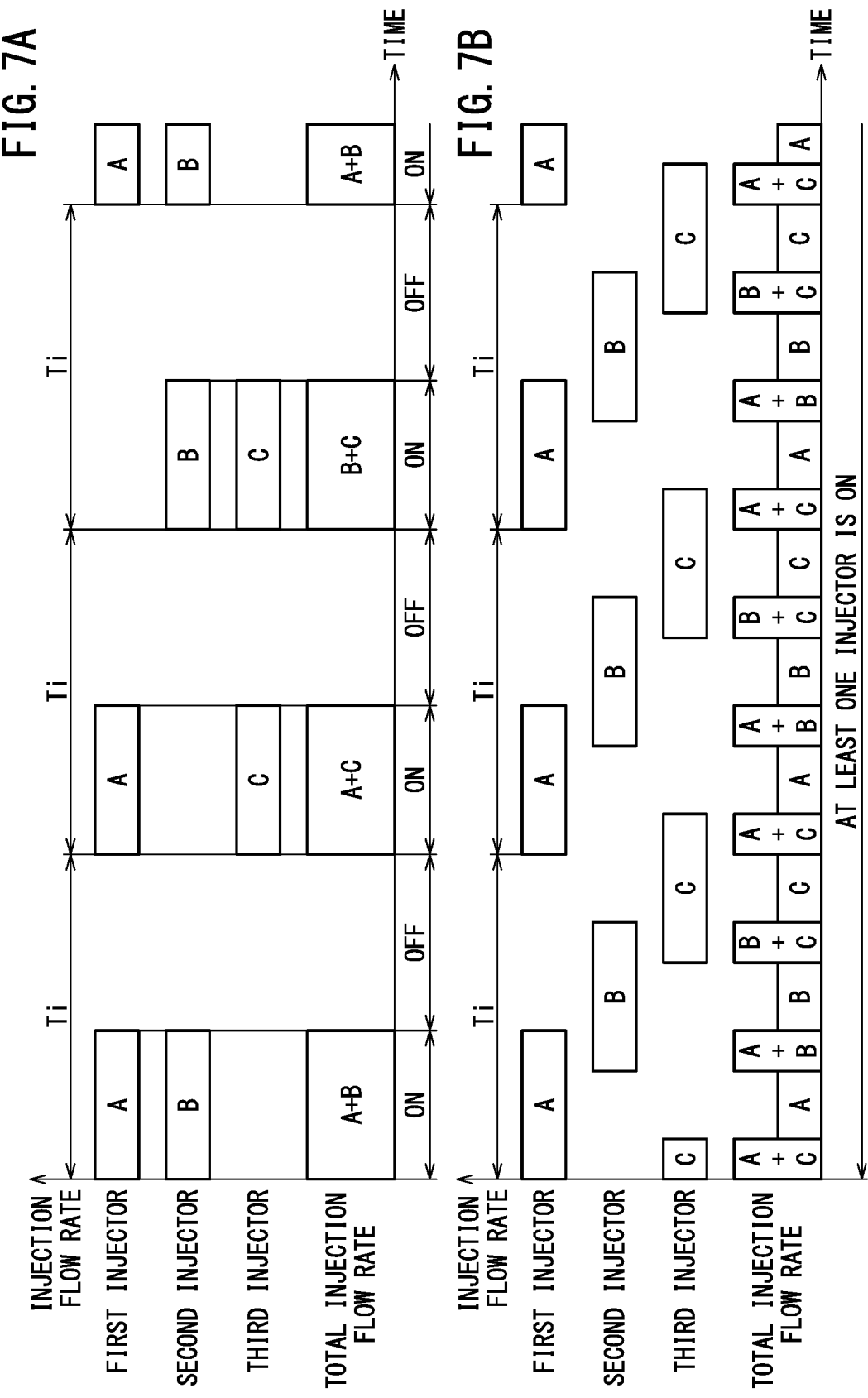

FUEL CELL SYSTEM

CROSS-REFERENCE TO RELATED APPLICATIONS

This application is based upon and claims the benefit of priority from Japanese Patent Application No. 2022-037132 filed on Mar. 10, 2022, the contents of which are incorporated herein by reference.

BACKGROUND OF THE INVENTION

Field of the Invention

The present invention relates to a fuel cell system including a fuel cell stack for generating electric power by electrochemical reactions between an oxygen-containing gas and a fuel gas.

Description of the Related Art

In recent years, research and development have been conducted on fuel cells that contribute to energy efficiency in order to ensure that more people have access to affordable, reliable, sustainable and modern energy.

For example, JP 2019-169264 A discloses a fuel cell system in which a plurality of injectors are provided in a fuel gas supply path, and the injector to inject fuel gas is determined depending on whether the fuel cell stack has a relatively high or low load.

SUMMARY OF THE INVENTION

In the fuel cell system disclosed in JP 2019-169264 A, switching control of the injectors for injecting fuel gas is performed on the basis of the amount of fuel gas consumption which indicates whether the load is relatively high or low. In contrast, there is a problem that JP 2019-169264 A does not disclose a viewpoint of drainability or discharging ability (electric power generation stability) of the amount of droplets (generated water) in the fuel cell stack. An object of the present invention is to solve the aforementioned problems.

A fuel cell system according to one embodiment of the present invention includes a fuel cell stack configured to generate electric power by an electrochemical reaction between an oxygen-containing gas and a fuel gas, a fuel gas supply path configured to supply the fuel gas to the fuel cell stack, a plurality of injectors provided at the fuel gas supply path and configured to individually inject the fuel gas toward the fuel cell stack or stop injecting the fuel gas, a power generation state detection unit configured to detect a power generation state of the fuel cell stack, and a control device, wherein the control device switches between a first injection control of injecting the fuel gas by sequentially providing periods during which at least one of the plurality of injectors injects the fuel gas if it is determined that the power generation state of the fuel cell stack is stable based on the power generation state detected by the power generation state detection unit, and a second injection control of injecting the fuel gas by intermittently providing periods during which the plurality of injectors simultaneously inject the fuel gas if it is determined that the power generation state of the fuel cell stack is not stable based on the power generation state detected by the power generation state detection unit.

According to the present invention, since the amount of liquid droplets inside the fuel cell stack is small in a situation where the power generation state is stable, if the periods during which at least one of the plurality of injectors injects the gas are sequentially provided, the injection flow rate (injection pressure) by one injector is sufficient to discharge the liquid droplets inside the fuel cell stack, and the power generation efficiency can be ensured. As a result, NV (noise vibration) performance of the fuel cell system can be improved (noise vibration can be reduced), and durability performance of the injector can be improved.

On the other hand, since the amount of liquid droplets inside the fuel cell stack is large in a situation where the power generation state is not stable, if the periods during which the plurality of injectors simultaneously inject the fuel gas are intermittently provided, the injection flow rate (injection pressure) for discharging water can be ensured, and the system can be made out of the situation where the power generation state is not stable. This in turn contributes to energy efficiency.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 3 is an explanatory view illustrating new findings by the inventors regarding the drainability (electric power generation stability) of the fuel cell stack;

FIG. 6 is a timing chart for describing an example of operations of the first and second examples which are described with reference to the flowcharts of FIGS. 4 and 5;

FIG. 7A is a time chart illustrating second injection control (intermittent and simultaneous injection control) by the first to third injectors; and FIG. 7B is a time chart illustrating first injection control (sequential and continuous injection control) by the first to third injectors.

DETAILED DESCRIPTION OF THE INVENTION

Configuration

Figure 1:
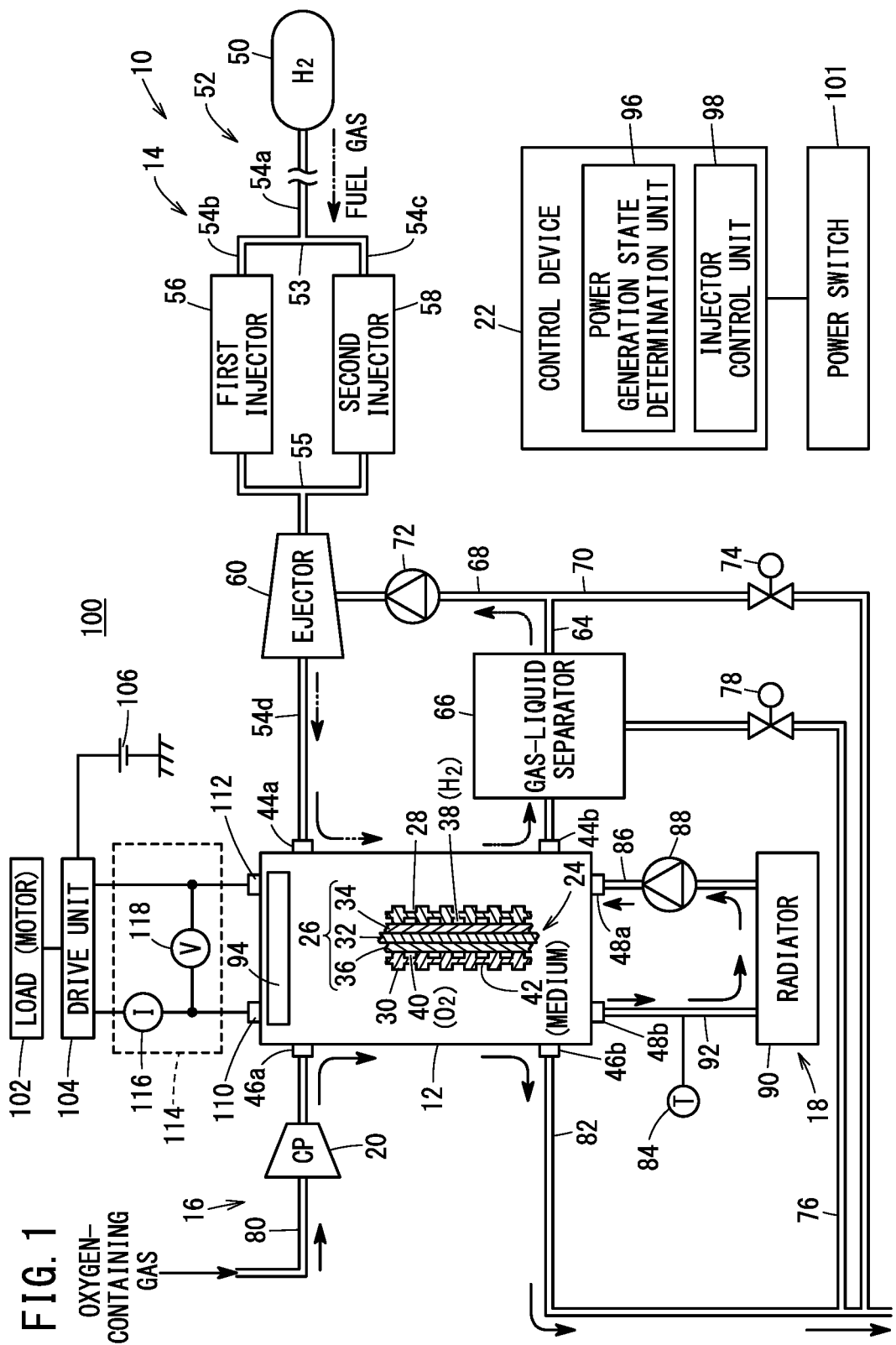
FIG. 1 is a schematic configuration diagram of a fuel cell vehicle equipped with a fuel cell system according to an embodiment.

FIG. 1 is a schematic configuration diagram of a fuel cell vehicle 100 equipped with a fuel cell system 10 according to an embodiment.

The fuel cell vehicle 100 includes the fuel cell system 10 and a load 102 which is a traction motor driven by electric power generated by the fuel cell system 10.

The fuel cell system 10 includes a fuel cell stack 12 (fuel cells). The fuel cell stack 12 is provided with a fuel gas supply device 14 for supplying a fuel gas which is a hydrogen gas, an oxygen-containing gas supply device 16 for supplying an oxygen-containing gas which is air, and a heat exchange medium supply device 18 for supplying a heat exchange medium which is a coolant.

The fuel cell system 10 further includes a drive unit 104, a battery 106 that is a high-voltage electrical power storage device, and a control device 22 that is a system control device.

In the fuel cell stack 12, a plurality of power generation cells 24 are stacked. The power generation cell 24 includes a membrane electrode assembly 26 sandwiched between a separator 28 and a separator 30. Each of the separators 28 and 30 is made of a metal separator or a carbon separator.

The membrane electrode assembly 26 includes, for example, a solid polymer electrolyte membrane 32 which is a thin membrane of perfluorosulfonic acid containing water, and an anode 34 and a cathode 36 sandwiching the solid polymer electrolyte membrane 32.

The fuel cell stack 12 includes a positive electrode terminal 110 and a negative electrode terminal 112.

The positive electrode terminal 110 is electrically connected through internal wiring (not shown) to the separator 30 that is in contact with the cathode 36 at one end of the stack of the power generation cells 24.

The negative electrode terminal 112 is electrically connected through internal wiring (not shown) to the separator 28 that is in contact with the anode 34 at another end of the stack of the power generation cells 24.

A stack power generation state detection unit 114 that functions as a stack generated current detection unit or a stack generated power detection unit is provided in both wirings that connect the positive electrode terminal 110 and the negative electrode terminal 112 to the drive unit 104.

In this case, a current sensor 116 that detects and measures a generated current Ifc is provided in the positive electrode side wiring that connects the positive electrode terminal 110 and the drive unit 104. A voltage sensor 118 that detects and measures a generated voltage (stack generated voltage) Vfc is provided between the positive electrode terminal 110 and the drive unit 104.

The stack power generation state detection unit 114 may be provided with a stack impedance detection unit including an impedance sensor that detects and measures the impedance (stack impedance) of the fuel cell stack 12 from outside the fuel cell stack 12.

Inside the fuel cell stack 12, a cell power generation state detection unit 94 including a voltage sensor that detects a generated voltage (cell generated voltage) Vcell of each power generation cell 24 is provided. The cell generated voltage Vcell of each power generation cell 24 detected by the cell power generation state detection unit 94 is led to an external terminal (not shown) of the fuel cell stack 12.

The cell power generation state detection unit 94 may be provided with a cell impedance sensor that detects and measures the impedance (cell impedance) of each power generation cell 24.

A fuel gas flow field 38 for guiding the fuel gas to the anode 34 is provided between the separator 28 and the membrane electrode assembly 26. An oxygen-containing gas flow field 40 for supplying the oxygen-containing gas to the cathode 36 is provided between the separator 30 and the membrane electrode assembly 26. A heat exchange medium flow field 42 through which the heat exchange medium flows is provided between the separator 28 and the separator 30 adjacent to each other.

The fuel cell stack 12 is provided with a fuel gas inlet 44a, a fuel gas outlet 44b, an oxygen-containing gas inlet 46a, an oxygen-containing gas outlet 46b, a heat exchange medium inlet 48a, and a heat exchange medium outlet 48b. The fuel gas inlet 44a penetrates through each of the power generation cells 24 in a stacking direction and communicates with a supply port of each fuel gas flow field 38. The fuel gas outlet 44b penetrates through each of the power generation cells 24 in the stacking direction and communicates with a discharge port of each fuel gas flow field 38.

The oxygen-containing gas inlet 46a penetrates through each of the power generation cells 24 in the stacking direction and communicates with a supply port of each oxygen-containing gas flow field 40. The oxygen-containing gas outlet 46b extends through the power generation cells 24 in the stacking direction and communicates with a discharge port of each oxygen-containing gas flow field 40.

The heat exchange medium inlet 48a penetrates through the power generation cells 24 in the stacking direction and communicates with a supply port of each heat exchange medium flow field 42. The heat exchange medium outlet 48b penetrates the power generation cells 24 in the stacking direction and communicates with a discharge port of each heat exchange medium flow field 42.

The fuel gas supply device 14 includes a fuel gas tank 50 that stores a high pressure fuel gas (high pressure hydrogen), and the fuel gas tank 50 communicates with the fuel gas inlet 44a of the fuel cell stack 12 via a fuel gas supply path 52. The fuel gas supply path 52 supplies the fuel gas to the fuel cell stack 12.

The fuel gas supply path 52 includes a first supply path 54a, a first branch path 54b, a second branch path 54c, and a second supply path 54d. An upstream end of the first supply path 54a is connected to the fuel gas tank 50. A downstream end of the first supply path 54a is connected to upstream ends (a branch portion 53) of the first branch path 54b and the second branch path 54c. The first branch path 54b and the second branch path 54c are provided in parallel. An upstream end of the second supply path 54d is connected to downstream ends (a merging portion 55) of the first branch path 54b and the second branch path 54c. A downstream end of the second supply path 54d is connected to the fuel gas inlet 44a.

A first injector 56 is provided in the first branch path 54b, and a second injector 58 is provided in the second branch path 54c. The first injector 56 is an electronically controlled fuel injection device having a known configuration, and injects downstream the fuel gas guided from the first supply path 54a to the first branch path 54b.

Although not illustrated in detail, the first injector 56 includes a valving element that opens and closes a flow path formed in an injector body, and a coil (solenoid) for actuating the valving element. The first injector 56 opens the valve when the coil is energized and closes the valve when the coil is de-energized. The second injector 58 has substantially the same configuration as that of the first injector 56. The second injector 58 injects downstream the fuel gas guided from the first supply path 54a to the second branch path 54c.

An ejector (EJ) 60 is disposed in the second supply path 54d. The ejector 60 generates a negative pressure in the fuel gas guided from the merging portion 55 by the Venturi effect to suction a fuel off-gas in a circulation flow path 68 described later, then mixes the fuel off-gas with the fuel gas to discharge downstream the mixed gas.

A fuel gas discharge path 64 communicates with the fuel gas outlet 44b of the fuel cell stack 12. The fuel gas discharge path 64 directs a fuel off-gas (fuel exhaust gas), which is a fuel gas that has been at least partially used in the anodes 34, outwardly from the fuel cell stack 12. A gas-liquid separator 66 is disposed in the fuel gas discharge path 64.

The circulation flow path 68 and a purge flow path 70 are connected to a downstream end of the fuel gas discharge path 64. The circulation flow path 68 guides the fuel off-gas to the ejector 60. A circulation pump 72 is provided in the circulation flow path 68. The circulation pump 72 circulates the fuel off-gas that has been discharged to the fuel gas discharge path 64, to the fuel gas supply path 52 through the circulation flow path 68.

A purge valve 74 is provided in the purge flow path 70. One end of a drain flow path 76 for discharging a fluid mainly containing a liquid component is connected to a bottom portion of the gas-liquid separator 66. The drain flow path 76 is provided with a drain valve 78.

The oxygen-containing gas supply device 16 includes an oxygen-containing gas supply path 80 communicating with the oxygen-containing gas inlet 46a of the fuel cell stack 12, and an oxygen-containing gas discharge path 82 communicating with the oxygen-containing gas outlet 46b of the fuel cell stack 12.

The oxygen-containing gas supply path 80 is provided with a compressor (CP) 20 that compresses and supplies an oxygen-containing gas (air from the atmosphere). The oxygen-containing gas supply path 80 introduces the oxygen-containing gas into the fuel cell stack 12, and the oxygen-containing gas discharge path 82 discharges the oxygen-containing off-gas, which is an oxygen-containing gas that has been at least partially used in the cathode 36, from the fuel cell stack 12.

The heat exchange medium supply device 18 includes a heat exchange medium supply path 86 connected to the heat exchange medium inlet 48a of the fuel cell stack 12. The heat exchange medium supply path 86 is provided with a heat exchange medium pump 88. The heat exchange medium supply path 86 is connected to a radiator 90, and a heat exchange medium discharge path 92 communicating with the heat exchange medium outlet 48b is connected to the radiator 90. The heat exchange medium discharge path 92 is provided with a temperature sensor 84 that detects and measures a temperature (heat exchange medium temperature) Tr of the heat exchange medium.

The control device 22 is constituted by an electronic control unit (ECU). The ECU is configured by a computer including one or more processors (CPU), a memory, an input/output interface, and an electronic circuit. The one or more processors (CPUs) execute an unillustrated program (computer-executable instructions) stored in the memory.

A power switch 101 of the fuel cell vehicle 100 is connected to the control device 22. The power switch 101 switches between the start or continuation (ON state) and the end (OFF state) of the power generation operation of the fuel cell stack 12 in the fuel cell system 10. An accelerator opening sensor, a vehicle speed sensor, and an SOC sensor of the battery 106, none of which are shown, are also connected to the control device 22.

The control device 22 controls the generated electric power of the fuel cell stack 12 based on the power required by the load 102 (demanded power calculated using the accelerator opening, the vehicle speed, the road gradient, and the like as variables). The load also includes the compressor 20, the heat exchange medium pump 88, and the circulation pump 72 that constitute the fuel cell system 10.

The control device 22 includes a power generation state determination unit 96 and an injector control unit 98.

The power generation state determination unit 96 determines whether the power generation state of the fuel cell stack 12 is stable or not (instable) based on the power generation state detected by the stack power generation state detection unit 114 and/or the cell power generation state detection unit 94.

The injector control unit 98 controls (opens and closes the valves of) the first injector 56 and the second injector 58. Specifically, in the case where the power switch 101 is in the ON state, the injector control unit 98 switches to the first injection control if the power generation state determination unit 96 determines that the power generation state is stable, and switches to the second injection control if the power generation state determination unit 96 determines that the power generation state is instable.

In the first injection control, for the injection of fuel gas, the periods during which at least one of the first injector 56 or the second injector 58 injects the fuel gas are sequentially or alternately provided.

In the second injection control, for the injection of fuel gas, the periods during which both the first injector 56 and the second injector 58 simultaneously inject the fuel gas are intermittently provided.

For convenience of understanding, the first injection control is also referred to as sequential and continuous injection control (sequential injection control), and the second injection control is also referred to as intermittent and simultaneous injection control.

As will be described in detail later, in the second injection control, a large pressure pulsation is generated in the fuel gas flow field 38 in the fuel cell stack 12. Therefore, the drainability for discharging the generated water in the fuel gas flow field 38 from the fuel gas outlet 44b is improved. On the other hand, in the first injection control, since the pressure pulsation width is reduced, it is possible to improve noise vibration (NV) performance, i.e., to reduce noise vibration.

Basic Operation

A basic operation of the fuel cell system 10 configured as described above will be described below.

In the case where the power switch 101 is in the ON state, in the fuel gas supply device 14, the fuel gas is supplied from the fuel gas tank 50 to the first supply path 54a. At this time, the injector control unit 98 performs valve opening control of at least one of the first injector 56 or the second injector 58. The fuel gas injected from the first injector 56 is guided from the first branch path 54b to the merging portion 55. The fuel gas injected from the second injector 58 is guided from the second branch path 54c to the merging portion 55.

The fuel gas guided to the merging portion 55 flows through the diffuser of the ejector 60 from a drive port nozzle of the ejector 60, and is supplied to the fuel gas inlet 44a via the second supply path 54d. The fuel gas supplied to the fuel gas inlet 44a is introduced into the fuel gas flow field 38, moves along the fuel gas flow field 38, and is thereby supplied to the anode 34 of the membrane electrode assembly 26.

In the oxygen-containing gas supply device 16, the external air is compressed by the compressor 20 and the pressurized oxygen-containing gas is sent to the oxygen-containing gas supply path 80. The oxygen-containing gas is supplied to the oxygen-containing gas inlet 46a of the fuel cell stack 12. The oxygen-containing gas is introduced from the oxygen-containing gas inlet 46a into the oxygen-containing gas flow field 40, flows along the oxygen-containing gas flow field 40, and is thereby supplied to the cathode 36 of the membrane electrode assembly 26.

In each of the membrane electrode assemblies 26, the fuel gas supplied to the anode 34, and oxygen within the oxygen-containing gas supplied to the cathode 36 are partially consumed by electrochemical reactions within the electrode catalyst layers, whereby generation of electrical power is carried out.

At the anode 34, when the fuel gas (hydrogen) is supplied, hydrogen ions are generated from hydrogen molecules by electrode reactions by the catalyst, and the hydrogen ions permeate through the solid polymer electrolyte membrane 32 and move to the cathode 36, while electrons are released from the hydrogen molecules.

The electrons released from the hydrogen molecules move from the negative electrode terminal 112 through the stack power generation state detection unit 114, the drive unit 104, and the load 102 to the cathode 36 via the positive electrode terminal 110.

At the cathode 36, the hydrogen ions and the electrons react with oxygen contained in the supplied oxygen-containing gas by the action of the catalyst to generate water.

Generated water permeates through the solid polymer electrolyte membrane 32 and reaches the anode 34. Therefore, generated water is in the fuel cell stack 12 (fuel gas flow field 38).

In the heat exchange medium supply device 18, a heat exchange medium such as pure water, ethylene glycol, or oil is supplied from the heat exchange medium supply path 86 to the heat exchange medium inlet 48a of the fuel cell stack 12, under the operation of the heat exchange medium pump 88. The heat exchange medium flows along the heat exchange medium flow field 42, cools the power generation cells 24, and is then discharged from the heat exchange medium outlet 48b to the heat exchange medium discharge path 92.

The fuel gas supplied to the anode 34 and partially consumed is discharged as a fuel off-gas from the fuel gas outlet 44b to the fuel gas discharge path 64. The fuel off-gas is introduced into a suction port of the ejector 60 from the fuel gas discharge path 64 via the circulation flow path 68.

The fuel off-gas introduced from the suction port is suctioned into the ejector 60 by the action of the negative pressure generated by the fuel gas introduced from the drive port nozzle, and mixed with the fuel gas. The mixed gas is discharged from a discharge port of the ejector 60 to the second supply path 54d.

The fuel gas discharged to the second supply path 54d in which the fuel off-gas is mixed, flows through the fuel gas inlet 44a into the fuel gas flow field 38 in the fuel cell stack 12.

The fuel off-gas discharged to the fuel gas discharge path 64 is discharged (purged) to the outside under the opening action of the purge valve 74 as necessary. Similarly, the oxygen-containing gas supplied to the cathode 36 and partially consumed, is discharged from the oxygen-containing gas outlet 46b to the oxygen-containing gas discharge path 82.

Injection Control Operation

Next, the switching operation of the fuel injection control by the first injector 56 and the second injector 58 of the fuel cell system 10 will be described in order of items (i) to (iii) below.

(i) Relationship between the heat exchange medium temperature Tr and the power generation stability based on stack anode differential pressure
(ii) [First Example]: Feedforward injection control of first injector 56 and second injector 58
(iii) [Second Example]: Feedback injection control of first injector 56 and second injector 58

(i) Relationship Between the Heat Exchange Medium Temperature Tr and the Power Generation Stability Based on Stack Anode Differential Pressure A state, in which the generated current Ifc supplied from the fuel cell stack 12 to the load 102 exceeds a current threshold value Ith (determined in advance for each vehicle type of the fuel cell vehicle 100), is referred to as a high load state. In general, in such a high load state, the amount of droplets of water generated in the fuel gas flow field 38 is large.

In order to discharge the generated water from the fuel gas flow fields 38 (fuel gas outlet 44b) of the fuel cell stack 12, the injector control unit 98 switches the injection control of the first injector 56 and the second injector 58 to the second injection control (intermittent and simultaneous injection control), in which a large stack anode differential pressure can be generated.

The stack anode differential pressure refers to a differential pressure of the fuel gas flow field 38 between the fuel gas inlet 44a (at high pressure) and the fuel gas outlet 44b (at low pressure).

Figure 2A:
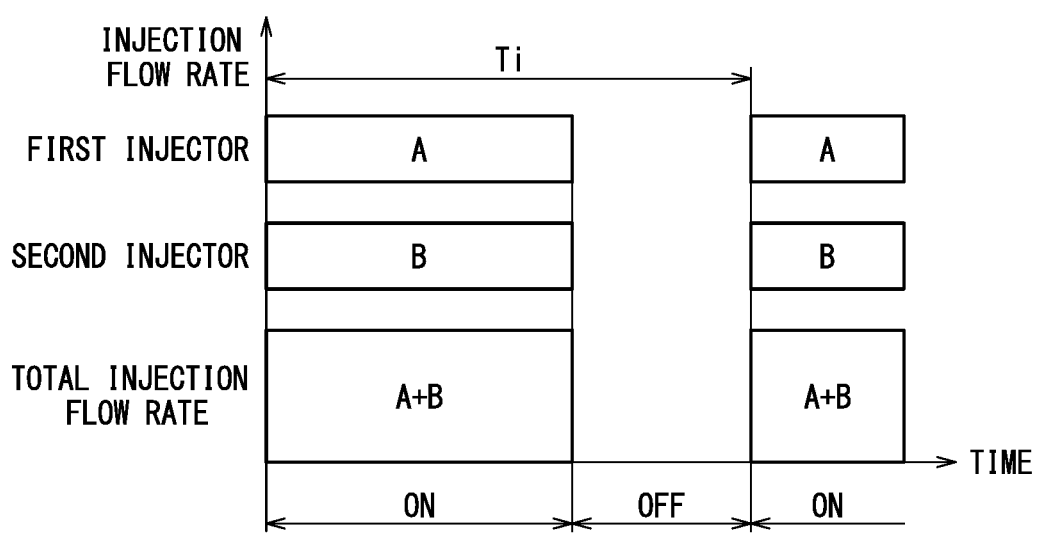
FIG. 2A is a time chart illustrating second injection control (intermittent and simultaneous injection control) by a first injector and a second injector.

FIG. 2A is a time chart illustrating the second injection control (intermittent and simultaneous injection control) by the first injector 56 having an injection flow rate A and the second injector 58 having an injection flow rate B (A=B). The horizontal axis indicates time, and the vertical axis indicates, in order from the top, the injection flow rate A of the first injector 56, the injection flow rate B of the second injector 58, and a total injection flow rate (A+B) of the first injector 56 and the second injector 58.

The first injector 56 and the second injector 58 intermittently repeat injection control and shut-off control with a predetermined duty, in which a simultaneous ON time (simultaneous injection time, ON duty) is larger than a simultaneous OFF time (simultaneous shut-off time, OFF duty) in a predetermined cycle (predetermined interval) Ti.

That is, in the second injection control (intermittent and simultaneous injection control), the control device 22 (injector control unit 98) sets the periods during which the first and second injectors 56 and 58 simultaneously and intermittently inject the fuel gas into the fuel gas flow field 38, to intermittently increase the stack anode differential pressure (injection flow rate A+B).

On the other hand, a state, in which the generated current Ifc supplied to the load 102 is lower than the current threshold value Ith, is referred to as a medium or low load state. In such a state, the amount of droplets of the water generated in the fuel gas flow field 38 is small. Therefore, if the periods during which at least one of the first injector 56 or the second injector 58 injects the gas are sequentially provided, the injection flow rate (injection pressure) by one injector is sufficient to discharge the droplets in the fuel cell stack 12, and the power generation efficiency can be ensured. Thus, the NV (noise vibration) performance of the fuel cell system 10 can be improved (noise vibration can be reduced).

Figure 2B:
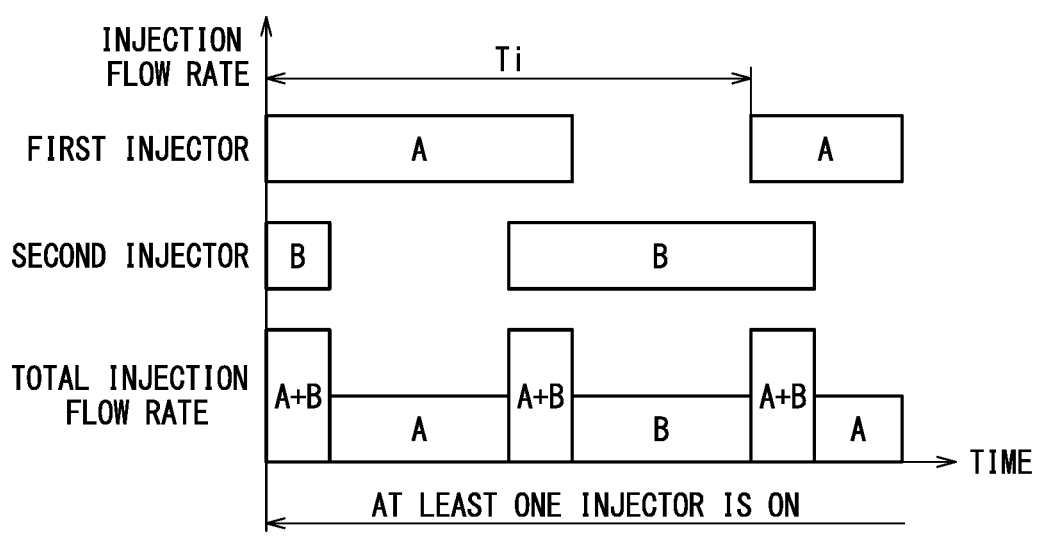
FIG. 2B is a time chart illustrating first injection control (sequential and continuous injection control) by the first injector and the second injector.

FIG. 2B is a time chart illustrating the first injection control (sequential and continuous injection control) by the first injector 56 having the injection flow rate A and the second injector 58 having the injection flow rate B (A=B). The horizontal axis indicates time, and the vertical axis indicates, in order from the top, the injection flow rate A of the first injector 56, the injection flow rate B of the second injector 58, and a total injection flow rate (A+B or A or B) of the first injector 56 and the second injector 58.

The injections of the first injector 56 and the second injector 58 are controlled such that a simultaneous ON (simultaneous injection) term, a first injector 56's ON and second injector 58's OFF (injection of only the first injector 56) term, a simultaneous ON (simultaneous injection) term, and a second injector 58's ON and first injector 56's OFF (injection of only the second injector 58) term are sequentially performed in a predetermined cycle (predetermined interval) Ti.

That is, in the first injection control (sequential and continuous injection control), the control device 22 (injector control unit 98) sequentially provides the periods to perform injection of the fuel gas from at least one of the first injector 56 or the second injector 58. Then, the simultaneous injection periods in the predetermined cycle (predetermined interval) Ti are reduced, so that the noise vibration (NV) performance of the fuel cell system 10 (fuel cell vehicle 100) is improved (reducing noise and vibration).

FIG. 3 shows new findings by the inventors regarding the drainability (power generation stability) of the fuel cell stack 12.

In FIG. 3, the horizontal axis indicates the temperature of the heat exchange medium (heat exchange medium temperature) Tr [° C.] detected and measured by the temperature sensor 84, and the vertical axis indicates the stack anode differential pressure. In the case where the generated current Ifc is the current threshold value Ith (Ifc=Ith), good power generation stability is plotted with a symbol of circle, and bad power generation stability (poor drainage) is plotted with a symbol of triangle.

As shown in FIG. 3, from a viewpoint of drainability in the fuel cell stack 12, it can be understood that injection control is required in consideration of the following parameters: the stack anode differential pressure generated by the first injection control (sequential and continuous injection control) performed by the first injector 56 and the second injector 58; the stack anode differential pressure generated by the second injection control (intermittent and simultaneous injection control); and the temperature of the heat exchange medium flowing through the heat exchange medium flow field 42 in the fuel cell stack 12 (the heat exchange medium temperature Tr measured by the temperature sensor 84).

That is, it is important to switch the injection control of the first injector 56 and the second injector 58 in consideration of the heat exchange medium temperature Tr (the temperature of the fuel cell stack 12), from the viewpoint of improvement in the power generation stability of the fuel cell stack 12 and improvement in the durability of the fuel cell stack 12.

That is, the power generation stability and the durability of the fuel cell stack 12 can be improved by switching the injection control of the first injector 56 and the second injector 58 in according with the heat exchange medium temperature Tr.

As can be seen from FIG. 3, in the case where the heat exchange medium temperature Tr is lower than the temperature threshold value Tth, the power generation stability deteriorates in the first injection control (sequential and continuous injection control), and thus it is preferable to perform the injection control by switching to the second injection control (intermittent and simultaneous injection control) uniformly.

Since the voltage (cell voltage) of each of the power generation cells 24 is detected by the cell power generation state detection unit 94, the control device 22 (power generation state determination unit 96) calculates an average cell voltage Vcmean, and obtains a difference (Vcmean−Vcmin) between the average cell voltage Vcmean and a minimum cell voltage Vcmin. The control device 22 uses the difference as an indicator to switch the injection control of the first injector 56 and the second injector 58, so that it is possible to improve the power generation stability and the durability of the fuel cell stack 12.

Furthermore, since this relationship changes with the generated current Ifc as a parameter, the value of the generated current Ifc also needs to be considered.

The larger the stack anode differential pressure is, the better the drainability is improved is. This is because when the stack anode differential pressure increases or the fuel gas flow rate increases due to the simultaneous injection of the first injector 56 and the second injector 58, the ability to drain water in the fuel gas flow field 38 inside the fuel cell stack 12 is improved.

In addition, when the heat exchange medium temperature Tr is high, the amount of condensed water in the fuel gas flow field 38 decreases and the amount of generated water decreases relatively, thereby improving drainability.

(ii) [First Example]: Feedforward Injection Control of First Injector 56 and Second Injector 58

The operation of the fuel cell vehicle 100 equipped with the fuel cell system 10 according to the first example will be described with reference to the flowchart of FIG. 4. The process according to the flowchart of FIG. 4 is repeatedly executed in a predetermined cycle by the control device 22.

Figure 4:
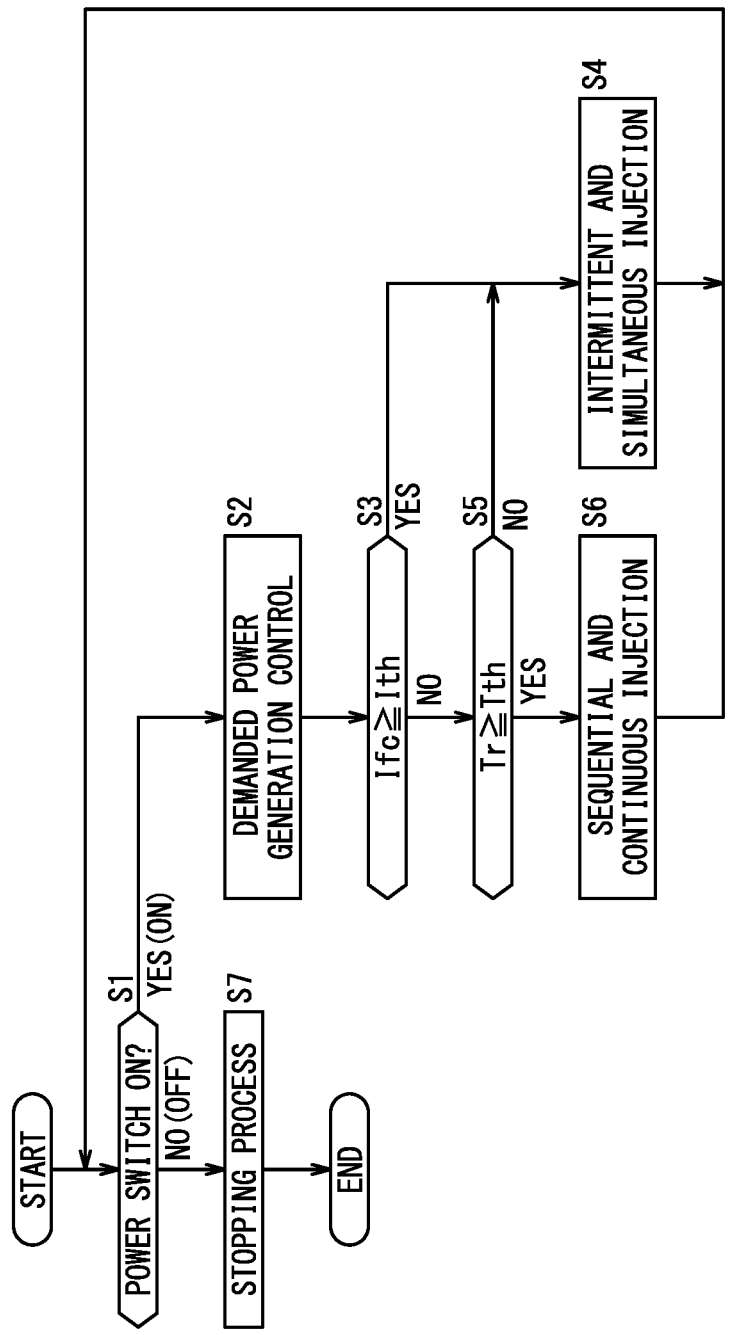
FIG. 4 is a flowchart for describing operations of the fuel cell vehicle equipped with a fuel cell system according to a first example.

In step S1 of FIG. 4, the control device 22 determines whether the power switch 101 is in an ON state or not (OFF state).

If the power switch 101 is in the ON state (step S1: YES), the process proceeds to step S2.

In step S2, the control device 22 performs demanded power generation control.

In this case, the control device 22 calculates a demanded generation power Preq for the fuel cell stack 12 of the load 102 based on the accelerator opening and the like. Then, the control device 22 controls the flow rate of the oxygen-containing gas supplied to the oxygen-containing gas flow field 40 of the fuel cell stack 12 by the oxygen-containing gas supply device 16 and the flow rate of the fuel gas supplied to the fuel gas flow field 38 of the fuel cell stack 12 by the fuel gas supply device 14, in order that a generated electric power Pfc (Pfc=Ifc×Vfc) of the fuel cell stack 12 becomes equal to the calculated demanded generation power Preq.

In this case, the control device 22 adjusts the flow rate of the oxygen-containing gas supplied to the fuel cell stack 12 by controlling the rotational speed of the compressor 20 and the flow rate of the fuel gas supplied to the fuel cell stack 12 by controlling the ON duties of the first injector 56 and the second injector 58 in accordance with the amount of the demanded generation power Preq. Then, the control device 22 performs the injection period (timing) determination control in step S3 and its subsequent steps.

In step S3, the power generation state determination unit 96 of the control device 22 determines whether or not the value of the generated current Ifc detected by the current sensor 116 is equal to or greater than a current reference value (predetermined value) Ith.

If the generated current Ifc is greater than or equal to the current reference value Ith (Ifc Ith, step S3: YES), the amount of droplets in the fuel gas flow field 38 is large, and the process proceeds to step S4.

In step S4, the injector control unit 98 of the control device 22 determines to switch the injection control by the first injector 56 and the second injector 58 to the second injection control (intermittent and simultaneous injection control) (FIG. 2A).

Thereafter, the injection control in the demanded power generation control in step S2 (after step S1: YES) is switched to the second injection control (intermittent and simultaneous injection control) (FIG. 2A).

On the other hand, in step S3, if the generated current Ifc is less than the current reference value Ith (Ifc<Ith, step S3: NO), the process proceeds to step S5.

In step S5, the power generation state determination unit 96 of the control device 22 determines whether or not the heat exchange medium temperature Tr detected by the temperature sensor 84 is equal to or higher than a temperature reference value (predetermined value) Tth.

If the heat exchange medium temperature Tr is less than the threshold temperature Tth (Tr<Tth, step S5: NO), the process proceeds to step S4 because the power generation stability deteriorates.

In step S4, the injector control unit 98 of the control device 22 determines to switch the injection control by the first injector 56 and the second injector 58 to the second injection control (intermittent and simultaneous injection control).

Thereafter, the control device 22 switches the injection control in the demanded power generation control in step S2 (after step S1: YES) to the second injection control (intermittent and simultaneous injection control) (FIG. 2A) by the injector control unit 98, and repeats the control: step S5 (NO)→step S4→step S1 (YES)→step S2→step S3 (NO)→step S5 (NO).

During the repetition of this control, if the heat exchange medium temperature Tr detected by the temperature sensor 84 in step S5 becomes equal to or higher than the temperature threshold value Tth, it is determined that the amount of liquid droplets in the fuel gas flow field 38 is small because the instable power generation is eliminated and the power generation stability is improved, and the generated current Ifc is less than the current threshold value Ith (step S3: NO). Then, the process proceeds to step S6.

In step S6, the injector control unit 98 determines to switch from the second injection control (intermittent and simultaneous injection control) to the first injection control (sequential and continuous injection control).

Thereafter, the control device 22 switches the injection control in the demanded power generation control at step S2 (after step S1: YES) to the first injection control (sequential and continuous injection control) (FIG. 2B) by the injector control unit 98, and repeats the process at step S3 and the subsequent steps: step S3 (NO)→step S5 (YES)→step S6→step S1 (YES)→step S2→step S3 (NO) . . . .

If the power switch 101 is switched from the ON state to the OFF state in step S1, the control device 22 performs a stopping process in step S7 and terminates the process.

In the stopping process of step S7, the control device 22 performs the second injection control (intermittent and simultaneous injection control) by the first injector 56 and the second injector 58, and operates the compressor 20 for a predetermined time to bring the membrane electrode assembly 26 into a predetermined dry state. Thereafter, the control device 22 terminates the supply of electricity to the auxiliary devices (the compressor 20, the circulation pump 72, the heat exchange medium pump 88, the first injector 56, and the second injector 58). At this time, a shut-off valve (not shown) of the fuel gas tank 50 is closed.

During power generation of the fuel cell stack 12, if the generated electric power Pfc used in the fuel cell vehicle 100 is insufficient, power is supplied from the battery 106, and if the electric power Pfc is generated in surplus, the power is stored in the battery 106.

(iii) [Second Example]: Feedback Injection Control of First Injector 56 and Second Injector 58

The operation of the fuel cell vehicle 100 equipped with the fuel cell system 10 according to the second example will be described with reference to the flowchart of FIG. 5. The process according to the flowchart of FIG. 5 is repeatedly executed in a predetermined cycle by the control device 22.

Figure 5:
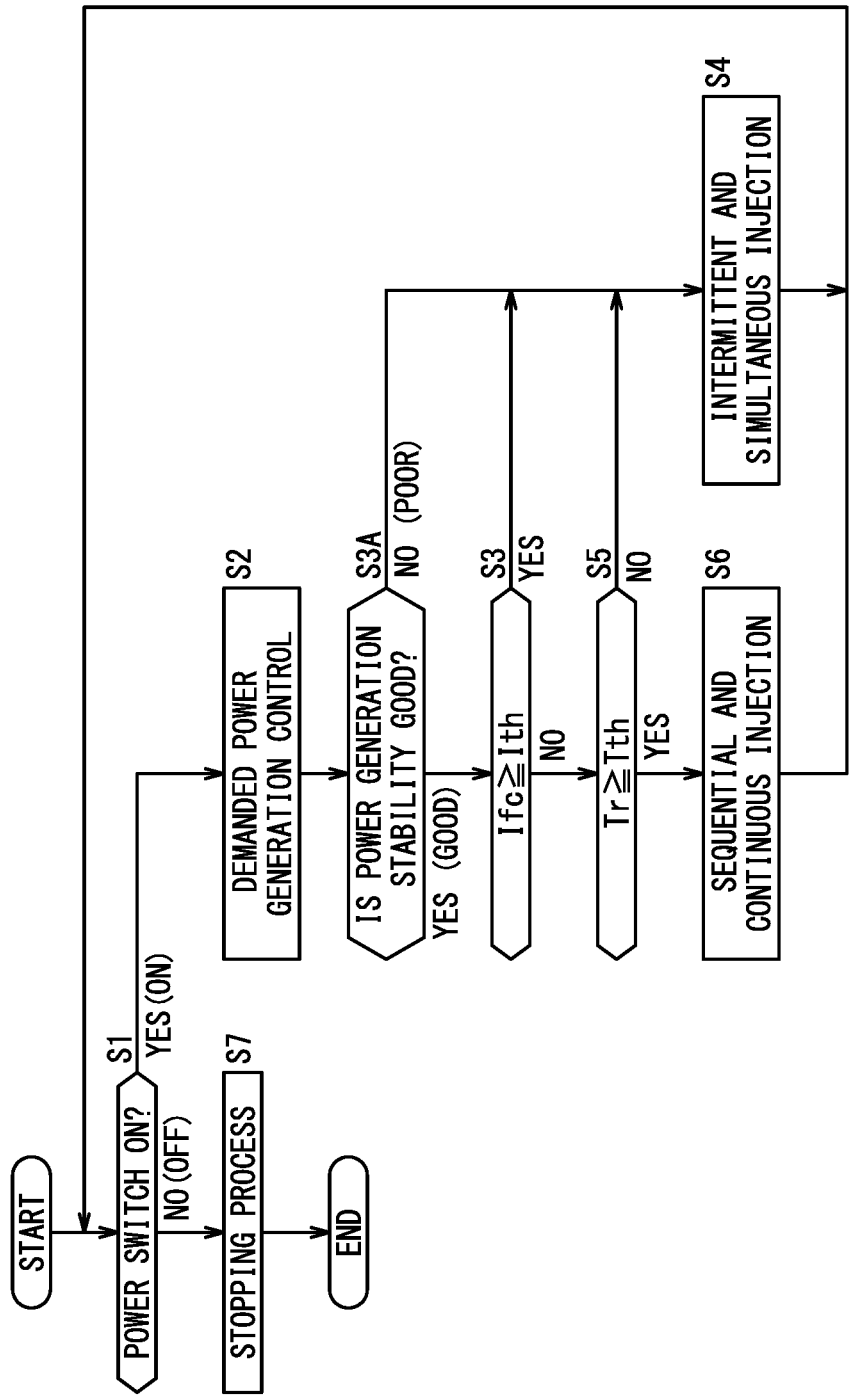
FIG. 5 is a flowchart for describing operations of the fuel cell vehicle equipped with a fuel cell system according to a second example.

In FIG. 5, the same step numbers are used to designate corresponding steps to those shown in FIG. 4, and detailed description of such steps is omitted.

In the flowchart of FIG. 5, in contrast to the flowchart of FIG. 4, when the injection period or timing is determined, a power generation stability determination process by the power generation state determination unit 96 in step S3A is added, before the magnitude determination between the generated current Ifc and the current threshold value Ith in step S3.

In the determination process of step S3A, for example, the power generation state determination unit 96 determines that the fuel cell system 10 is instable if the difference (Vcmean−Vcmin) between the average cell voltage Vcmean and the minimum cell voltage Vcmin detected by the cell power generation state detection unit 94 is equal to or greater than a predetermined cell voltage threshold value Vth {(Vcmean−Vcmin)≥Vth} (step S3A: NO). Then, the process proceeds to step S4.

In step S4, since the power generation state is instable, the power generation state determination unit 96 determines to switch the injection control by the first injector 56 and the second injector 58 to the second injection control (intermittent and simultaneous injection control) in order to eliminate this instability.

Thereafter, the control device 22 switches the injection control in the demanded power generation control in step S2 (after step S1: YES) to the second injection control (intermittent and simultaneous injection control) (FIG. 2A) by the injector control unit 98, and then performs the following steps repeatedly: step S3A (NO)→step S4→step S1 (YES)→step S2→step S3A (NO)→step S4.

During the repetition of this control, if the determination in step S3A becomes true (affirmative) and the power generation state determination unit 96 determines that good power generation stability has been achieved, the processing in step S3 and its subsequent steps described above is performed.

Description of Main Part Operation with Timing Chart

An example of operations of the first and second examples described with reference to the flowcharts of FIGS. 4 and 5 will be described with reference to the timing chart of FIG. 6.

When the power switch 101 is turned ON at time t1, the power generation control at the time of start-up is started, and the second injection control (intermittent and simultaneous injection control) is set at time t2 to start power generation.

When the power generation control at the time of start-up ends at time t3, the demanded power generation control (step S2), which is normal operation, is started after time t3.

During a time period from time t3 to time t4, the generated current Ifc is less than the current threshold value Ith (step S3: NO) and the heat exchange medium temperature Tr is less than the temperature threshold value Tth (step S5: NO). Therefore, the second injection control (intermittent and simultaneous injection control) is continued.

During a time period from time t4 to time t5, the generated current Ifc is less than the current threshold value Ith (step S3: NO), and the heat exchange medium temperature Tr is increased to the temperature threshold value Tth or more (step S5: YES). Therefore, the injection control is switched to the first injection control (sequential and continuous injection control).

During a time period from the time point t5 to the time point t6, the generated current Ifc is equal to or greater than the current threshold value Ith (step S3: YES), and thus the injection control is switched to the second injection control (intermittent and simultaneous injection control).

During a time period from time t6 to time t7, the generated current Ifc is less than the current threshold value Ith (step S3: NO) and the heat exchange medium temperature Tr is equal to or higher than the temperature threshold value Tth (step S5: YES). Therefore, the injection control is switched to the first injection control (sequential and continuous injection control).

During a time period from time t7 to time t8, the generated current Ifc is less than the current threshold value Ith (step S3: NO), and the heat exchange medium temperature Tr is less than the temperature threshold value Tth (step S5: NO). Therefore, the injection control is switched to the second injection control (intermittent and simultaneous injection control).

When the power switch 101 is turned OFF at time t8, a stopping process (step S7) for performing the second injection control (intermittent and simultaneous injection control) is performed. Then, at time t9, the fuel cell system 10 is brought into a shut-off state (a standby state until the next activation, also referred to as a stoppage state).

Although the heat exchange medium temperature Tr is detected in the heat exchange medium discharge path 92 communicating with the heat exchange medium outlet 48b in the above-described embodiment, the temperature may be detected in the heat exchange medium supply path 86 communicating with the heat exchange medium inlet 48a. An inlet/outlet temperature difference or an average value between the temperature of the heat exchange medium discharge path 92 and the temperature of the heat exchange medium supply path 86 may be used.

Modifications

The following modifications are also possible. In the above-described embodiment, the two injectors of the first injector 56 and the second injector 58 are provided in parallel to perform the injection switching control of the first injection control (sequential and continuous injection control) and the second injection control (intermittent and simultaneous injection control). Further, three or more injectors may be provided in parallel to perform the injection switching control of the first injection control (sequential and continuous injection control) and the second injection control (intermittent and simultaneous injection control).

FIG. 7A is a time chart illustrating the second injection control (intermittent and simultaneous injection control) by a first injector having an injection flow rate A and a second injector having an injection flow rate B, and a third injector having an injection flow rate C (A=B=C). The horizontal axis indicates time, and the vertical axis indicates, in order from the top, the injection flow rate A of the first injector, the injection flow rate B of the second injector, the injection flow rate C of the third injector, and a total injection flow rate of the combination of the first to third injectors.

The first to third injectors intermittently repeat injection control and shutoff control with a predetermined duty in which a simultaneous ON time (simultaneous injection time, ON duty) of two injectors is larger than a simultaneous OFF time (simultaneous shutoff time, OFF duty) of three injectors in a predetermined cycle (predetermined interval) Ti.

That is, in the second injection control (intermittent and simultaneous injection control), the control device 22 (injector control unit 98) intermittently sets the period during which two injectors among the first to third injectors simultaneously and intermittently inject the fuel gas, to intermittently increase the stack anode differential pressure (injection flow rate A+B, B+C, or A+C).

FIG. 7B is a time chart showing the first injection control (sequential and continuous injection control) by the first injector having the injection flow rate A, the second injector having the injection flow rate B, and the third injector having the injection flow rate C. The horizontal axis indicates time, and the vertical axis indicates, in order from the top, the injection flow rate A of the first injector, the injection flow rate B of the second injector, the injection flow rate C of the third injector (A=B=C), and the total injection flow rate (A+C, A+B, B, B+C, or C) of two injectors among the first to third injectors.

The first to third injectors switch a combination of two simultaneous ON (simultaneous injection) terms and one ON term over time in the predetermined cycle (predetermined interval) Ti.

That is, in the first injection control (sequential and continuous injection control), the control device 22 (injector control unit 98) sequentially provides the periods to perform injection of the fuel gas from at least one of the first, the second or the third injector. Then, the simultaneous injection periods in the predetermined cycle (predetermined interval) Ti are reduced, so that the noise vibration (NV) performance of the fuel cell system 10 (fuel cell vehicle 100) is improved (reducing noise and vibration).

According to the switching control of the modification described with reference to FIG. 7A, the ON duty of the first to third injectors in a cycle three times the predetermined cycle (predetermined interval) Ti is reduced to ⅔ (two thirds) as compared with the switching control of FIG. 2A and FIG. 2B described in the embodiment. Therefore, the service lives of the first to third injectors can be prolonged.

Invention that can be Understood from Embodiment and Modifications

Hereinafter, inventions that can be obtained from the above-described embodiment and the modification thereof will be described below. Although to facilitate understanding, the constituent elements are partially designated by the reference numerals used in the above-described embodiment and modification, the constituent elements are not limited to those elements to which such reference numerals are applied.

(1) The fuel cell system 10 according to the present invention includes the fuel cell stack 12 configured to generate electric power by an electrochemical reaction between the oxygen-containing gas and the fuel gas, the fuel gas supply path 52 configured to supply the fuel gas to the fuel cell stack, the plurality of injectors 56, 58 provided at the fuel gas supply path and configured to individually inject the fuel gas toward the fuel cell stack or stop injecting the fuel gas, the power generation state detection unit 94, 114 configured to detect the power generation state of the fuel cell stack, and the control device 22, wherein the control device switches between a first injection control of injecting the fuel gas by sequentially providing periods during which at least one of the plurality of injectors injects the fuel gas if it is determined that the power generation state of the fuel cell stack is stable based on the power generation state detected by the power generation state detection unit, and a second injection control of injecting the fuel gas by intermittently providing periods during which the plurality of injectors simultaneously inject the fuel gas if it is determined that the power generation state of the fuel cell stack is not stable based on the power generation state detected by the power generation state detection unit.

According to this configuration, since the amount of liquid droplets inside the fuel cell stack is small in a situation where the power generation state is stable, if the periods during which at least one of the plurality of injectors injects the gas are sequentially provided, the injection flow rate (injection pressure) by one injector is sufficient to discharge the liquid droplets inside the fuel cell stack, and the power generation efficiency can be ensured. As a result, the NV (noise vibration) performance of the fuel cell system can be improved (noise vibration can be reduced), and the durability performance of the injector can be improved.

On the other hand, since the amount of liquid droplets inside the fuel cell stack is large in a situation where the power generation state is not stable, if the periods during which the plurality of injectors simultaneously inject the fuel gas are intermittently provided, the injection flow rate (injection pressure) for discharging water can be ensured, and the system can be made out of the situation where the power generation state is not stable. This in turn contributes to energy efficiency.

(2) In the fuel cell system, the fuel cell stack may include the plurality of stacked power generation cells 24, the power generation state detection unit may detect power generation states of the plurality of power generation cells, and the control device may determine that the power generation state of the fuel cell stack is stable if the difference between the power generation states of the plurality of power generation cells detected by the power generation state detection unit is less than the predetermined value.

In this way, since based on the power generation state between the power generation cells, it is possible to determine easily and highly accurately whether or not the power generation state of the fuel cell stack is stable, the first injection control and the second injection control by the plurality of injectors can be quickly and accurately switched.

(3) Furthermore, the fuel cell system may further include the heat exchange medium supply device 18 configured to supply to the fuel cell stack the heat exchange medium that performs heat exchange in the fuel cell stack, and the temperature sensor 84 configured to detect a temperature of the heat exchange medium, the temperature sensor serving as the power generation state detection unit, wherein the control device may switch to the first injection control if the temperature of the heat exchange medium detected by the temperature sensor is equal to or higher than a temperature threshold value, and switch to the second injection control if the temperature of the heat exchange medium detected by the temperature sensor is lower than the temperature threshold value.

As described above, since based on the temperature of the heat exchange medium correlated with the power generation stable state of the fuel cell stack, the power generation state of the fuel cell stack can be easily and accurately determined, the first injection control and the second injection control by the plurality of injectors can be quickly and accurately switched.

(4) Furthermore, the fuel cell system may further include the heat exchange medium supply device configured to supply to the fuel cell stack the heat exchange medium that performs heat exchange in the fuel cell stack, and the temperature sensor configured to detect the temperature of the heat exchange medium and the current sensor 116 configured to detect the generated current of the fuel cell stack, the temperature sensor and the current sensor serving as the power generation state detection unit, wherein the control device may perform the first injection control if the generated current detected by the current sensor is less than a current threshold value and the temperature of the heat exchange medium detected by the temperature sensor is equal to or higher than the threshold temperature.

As a result, the injection flow rate (injection pressure) by one injector is sufficient to discharge the liquid droplets inside the fuel cell stack, and the periods of the first injection control by which the power generation efficiency can be secured can be determined with higher accuracy. Thus, the NV (noise vibration) performance of the fuel cell system can be further improved (noise vibration can be reduced).

The present invention is not limited to the above-described embodiment, and various configurations could be adopted therein without deviating from the essence and gist of the present invention.

The invention claimed is:

1. A fuel cell system comprising:
   a fuel cell stack configured to generate electric power by an electrochemical reaction between an oxygen-containing gas and a fuel gas;
   a fuel gas supply path configured to supply the fuel gas to the fuel cell stack;
   a plurality of injectors provided at the fuel gas supply path and configured to individually inject the fuel gas toward the fuel cell stack or stop injecting the fuel gas;
   a power generation state detection unit configured to detect a power generation state of the fuel cell stack; and
   one or more processors that execute computer-executable instructions stored in a memory;
   wherein the one or more processors execute the computer-executable instructions to cause the fuel cell system to switch between a first injection control of injecting the fuel gas by sequentially providing periods during which at least one of the plurality of injectors injects the fuel gas if it is determined that the power generation state of the fuel cell stack is stable based on the power generation state detected by the power generation state detection unit, and
   a second injection control of injecting the fuel gas by intermittently providing periods during which the plurality of injectors simultaneously inject the fuel gas if it is determined that the power generation state of the fuel cell stack is not stable based on the power generation state detected by the power generation state detection unit.

2. The fuel cell system according to claim 1, wherein the fuel cell stack comprises a plurality of stacked power generation cells,
the power generation state detection unit detects power generation states of the plurality of power generation cells, and
the processor determines that the power generation state of the fuel cell stack is stable if a difference between the power generation states of the plurality of power generation cells detected by the power generation state detection unit is less than a predetermined value.

3. The fuel cell system according to claim 1, further comprising:
a heat exchange medium supply device configured to supply to the fuel cell stack a heat exchange medium that performs heat exchange in the fuel cell stack; and
a temperature sensor configured to detect a temperature of the heat exchange medium, the temperature sensor serving as the power generation state detection unit,
wherein the processor switches to the first injection control if the temperature of the heat exchange medium detected by the temperature sensor is equal to or higher than a temperature threshold value, and switches to the second injection control if the temperature of the heat exchange medium detected by the temperature sensor is lower than the temperature threshold value.

4. The fuel cell system according to claim 1, further comprising:
a heat exchange medium supply device configured to supply to the fuel cell stack a heat exchange medium that performs heat exchange in the fuel cell stack; and
a temperature sensor configured to detect a temperature of the heat exchange medium and a current sensor configured to detect a generated current of the fuel cell stack, the temperature sensor and the current sensor serving as the power generation state detection unit,
wherein the processor performs the first injection control if the generated current detected by the current sensor is less than a current threshold value and the temperature of the heat exchange medium detected by the temperature sensor is equal to or higher than a threshold temperature.

5. The fuel cell system according to claim 2, further comprising:
a heat exchange medium supply device configured to supply to the fuel cell stack a heat exchange medium that performs heat exchange in the fuel cell stack; and
a temperature sensor configured to detect a temperature of the heat exchange medium, the temperature sensor serving as the power generation state detection unit,
wherein the processor switches to the first injection control if the temperature of the heat exchange medium detected by the temperature sensor is equal to or higher than a temperature threshold value, and switches to the second injection control if the temperature of the heat exchange medium detected by the temperature sensor is lower than the temperature threshold value.

6. The fuel cell system according to claim 2, further comprising:
a heat exchange medium supply device configured to supply to the fuel cell stack a heat exchange medium that performs heat exchange in the fuel cell stack; and
a temperature sensor configured to detect a temperature of the heat exchange medium and a current sensor configured to detect a generated current of the fuel cell stack, the temperature sensor and the current sensor serving as the power generation state detection unit,
wherein the processor performs the first injection control if the generated current detected by the current sensor is less than a current threshold value and the temperature of the heat exchange medium detected by the temperature sensor is equal to or higher than a threshold temperature.

\* \* \* \* \*